(12) United States Patent
Wagner (10) Patent No.: US 7,563,426 B2
(45) Date of Patent: Jul. 21, 2009

(54) METHOD AND APPARATUS FOR PREPARING A COLLECTION SURFACE FOR USE IN PRODUCING CARBON NANOSTRUCTURES

(75) Inventor: Anthony S. Wagner, Lakeway, TX (US)

(73) Assignee: Clean Technologies International Corporation, Sherwood, AR (US)

( * ) Notice: Subject to any disclaimer, the term of this patent is extended or adjusted under 35 U.S.C. 154(b) by 730 days.

(21) Appl. No.: 11/025,717

(22) Filed: Dec. 29, 2004

(65) Prior Publication Data

US 2006/0008406 A1 Jan. 12, 2006

Related U.S. Application Data

(63) Continuation-in-part of application No. 10/887,695, filed on Jul. 9, 2004.

(51) Int. Cl.
*B01J 19/08* (2006.01)
*F23G 7/00* (2006.01)

(52) U.S. Cl. .............. 423/445 R; 423/447.1; 423/445 B; 977/842; 977/844; 110/235; 110/237; 110/243

(58) Field of Classification Search .......... 423/445 B, 423/460, 461, DIG. 12, 447.1, 447.3; 110/235, 110/237, 243; 977/844, 842
See application file for complete search history.

(56) References Cited

U.S. PATENT DOCUMENTS

| | | | |
|---|---|---|---|
| 3,066,099 A | 11/1962 | Mohun | |
| 4,357,234 A * | 11/1982 | Inculet et al. ............ | 209/127.3 |
| 4,663,230 A | 5/1987 | Tennent | |
| 5,000,101 A * | 3/1991 | Wagner ............ | 110/346 |
| 5,094,906 A | 3/1992 | Witzke et al. | |
| 5,167,919 A | 12/1992 | Wagner | |
| 5,271,341 A | 12/1993 | Wagner | |
| 5,346,683 A | 9/1994 | Green et al. | |
| 5,359,947 A | 11/1994 | Wagner | |
| 5,424,054 A | 6/1995 | Bethune et al. | |
| 5,431,113 A * | 7/1995 | Wagner ............ | 110/237 |
| 5,452,671 A | 9/1995 | Wagner | |
| 5,457,343 A | 10/1995 | Ajayan et al. | |
| 5,461,991 A | 10/1995 | Wagner | |

(Continued)

OTHER PUBLICATIONS

Journet, et al., Production of carbon nanotubes, Appl. Phys. A 1998; 67: 1-9.*

(Continued)

*Primary Examiner*—Stuart L. Hendrickson
*Assistant Examiner*—Daniel C. McCracken
(74) *Attorney, Agent, or Firm*—Russell D. Culbertson; The Culbertson Group, P.C.

(57) ABSTRACT

A method includes producing deposition conditions in a collection area above a reactant liquid containing one or more catalyst metals. The reactant liquid is maintained under conditions in which atoms of the catalyst metal may escape from the reactant liquid into the collection area. A suitable carrier gas is directed to traverse a surface of the reactant liquid and flow along a collection path that passes over a collection surface in the collection area. This flow of carrier gas is maintained so that escaped atoms of catalyst metal are entrained in the gas traversing the surface of the reactant liquid and are deposited on the collection surface prior to or concurrently with nanocarbon structure formation at the collection surface.

19 Claims, 3 Drawing Sheets

U.S. PATENT DOCUMENTS

| | | | |
|---|---|---|---|
| 5,482,601 | A | 1/1996 | Ohshima et al. |
| 5,489,477 | A | 2/1996 | Ohta et al. |
| 5,553,558 | A | 9/1996 | Wagner |
| 5,560,898 | A | 10/1996 | Uchida et al. |
| 5,564,351 | A | 10/1996 | Wagner |
| 5,640,702 | A * | 6/1997 | Shultz ............................ 588/1 |
| 5,641,466 | A | 6/1997 | Ebbesen et al. |
| 5,695,734 | A | 12/1997 | Ikazaki et al. |
| 5,698,175 | A | 12/1997 | Hiura et al. |
| 5,753,088 | A | 5/1998 | Olk |
| 5,832,845 | A | 11/1998 | Wagner |
| 6,037,517 | A * | 3/2000 | Wagner ........................ 588/1 |
| 6,069,290 | A * | 5/2000 | Wagner ........................ 588/1 |
| 6,195,382 | B1 | 2/2001 | Wagner |
| 6,227,126 | B1 * | 5/2001 | Wagner ..................... 110/250 |
| 6,256,466 | B1 | 7/2001 | Ota et al. |
| 6,270,735 | B2 | 8/2001 | Wagner |
| 6,303,094 | B1 | 10/2001 | Kusunoki et al. |
| 6,333,016 | B1 | 12/2001 | Resasco et al. |
| 6,346,221 | B1 * | 2/2002 | Wagner .................. 422/184.1 |
| 6,355,857 | B1 | 3/2002 | Wagner |
| 6,451,175 | B1 | 9/2002 | Lal |
| 6,455,021 | B1 | 9/2002 | Saito |
| 6,669,755 | B2 | 12/2003 | Wagner |
| 6,683,783 | B1 | 1/2004 | Smalley et al. |
| 6,717,026 | B2 * | 4/2004 | Wagner ..................... 588/314 |
| 6,740,224 | B1 | 5/2004 | Benavides et al. |
| 6,740,403 | B2 | 5/2004 | Gogotsi et al. |
| 6,761,871 | B2 | 7/2004 | Little |
| 6,765,949 | B2 | 7/2004 | Chang |
| 6,841,003 | B2 | 1/2005 | Kang et al. |
| 6,843,850 | B2 | 1/2005 | Avouris et al. |
| 6,929,676 | B2 | 8/2005 | Wagner |
| 7,034,197 | B2 | 4/2006 | Wagner |
| 7,365,237 | B2 | 4/2008 | Wagner |
| 2002/0102193 | A1 | 8/2002 | Smalley et al. |
| 2002/0127169 | A1 | 9/2002 | Smalley et al. |
| 2002/0159943 | A1 | 10/2002 | Smalley et al. |
| 2003/0109768 | A1 | 6/2003 | Wagner |
| 2003/0129119 | A1 | 7/2003 | Chiu et al. |
| 2004/0057896 | A1 * | 3/2004 | Kronholm et al. ........... 423/461 |
| 2004/0191138 | A1 | 9/2004 | Wagner |
| 2005/0261760 | A1 | 11/2005 | Weber |
| 2006/0008403 | A1 | 1/2006 | Wagner |
| 2006/0008405 | A1 | 1/2006 | Wagner |
| 2006/0008406 | A1 | 1/2006 | Wagner |
| 2006/0021510 | A1 | 2/2006 | Henley et al. |
| 2006/0034746 | A1 | 2/2006 | Wagner |
| 2007/0116633 | A1 | 5/2007 | Wagner |
| 2008/0050303 | A1 | 2/2008 | Wagner |
| 2008/0056980 | A1 | 3/2008 | Wagner |

OTHER PUBLICATIONS

Mamalis, et al., Nanotechnology and nanostructured materials: trends in carbon nanotubes, Precision Engineering 2004; 28: 16-30.*
Dai, Carbon nanotubes: opportunities and challenges, Surface Science 2002: 500: 218-241.*
Height, et al., Flame synthesis of single-walled carbon nanotubes, Carbon 2004; 42: 2294-2307.*
Journet, et al., Large-scale production of single-walled carbon nanotubes by the electric-arc technique, Nature 1997; 338: 756-758.*
Levesque et al., "Monodisperse carbon nanopearls in a foam-like arrangement: a new carbon nano-compound for cold cathodes," Elsevier, Thin Solid Films, Jul. 28, 2004; vol. 464-465, pp. 308-314.
Dresselhaus et al., "Carbon Nanotubes Synthesis, Structure, Properties, and Applications," Topics of Applied Physics, Springer (2001), 7 pages.
International Search Report for PCT/US2005/023370 dated Sep. 20, 2006, 2 pages.
Written Opinion of the International Search Authority (PCT Rule 43bis. 1) for PCT/US2005/023370 dated Sep. 20, 2006, 4 pages.
International Search Report for PCT/US2005/029085 dated Sep. 5, 2006, 2 pages.
Written Opinion of the International Search Authority (PCT Rule 43bis. 1) for PCT/US2005/029085 dated Sep. 5, 2006, 3 pages.
International Search Report for PCT/US2006/023962 dated Jul. 18, 2008, 2 pages.
Written Opinion of the International Search Authority (PCT Rule 43bis. 1) for PCT/US2006/023962 dated Jul. 18, 2008, 4 pages.
International Search Report for PCT/US2007/067794 dated Apr. 30, 2008, 2 pages.
Written Opinion of the International Search Authority (PCT Rule 43bis. 1) for PCT/US2007/067794 dated Apr. 30, 2008, 6 pages.
Wagner, "Method and Apparatus for Producing Carbon Nanostructures," filed Oct. 31, 2007, U.S. Appl. No. 11/931,802, 30 pages.
Wagner, "Method and Apparatus for Preparing a Collection Surface for Use in a Produccing Carbon Nanostructures," filed Oct. 31, 2007, U.S. Appl. No. 11/932,020, 34 pages.

* cited by examiner

METHOD AND APPARATUS FOR PREPARING A COLLECTION SURFACE FOR USE IN PRODUCING CARBON NANOSTRUCTURES

CROSS-REFERENCE TO RELATED APPLICATION

This application is a continuation-in-part of U.S. patent application Ser. No. 10/887,695, filed Jul. 9, 2004 and entitled "Method and Apparatus for Producing Carbon Nanostructures." The Applicant claims the benefit of this prior application pursuant to 35 U.S.C. §120. The entire content of this prior application is incorporated herein by this reference.

TECHNICAL FIELD OF THE INVENTION

The present invention relates to the manufacture of carbon nanostructures. More particularly, the invention relates to a method and apparatus for producing a collection surface on which the chemical and physical conditions are controlled to facilitate the formation of carbon nanostructures.

BACKGROUND OF THE INVENTION

Carbon nanostructures have received a great deal of interest since their discovery. It has been suggested that carbon nanostructures may have important applications in electronics, in materials sciences, and in a number of additional fields. As used in this disclosure, a carbon nanostructure comprises a structure formed from chemically bonded carbon atoms, with or without impurities or intentionally added materials incorporated in the carbon structure or adjacent to the carbon structure. Carbon nanostructures include structures in which carbons atoms are arranged in generally a series of interconnected hexagonal rings formed into a tube or other structure. Carbon nanostructures may be single walled or multiple walled nanotubes, nanofibers, nanorope, or nanowire. Single wall nanotubes include a single layer of the hexagonally arranged carbon atoms, while multiple walled nanotubes are made up of an inner layer of carbon atoms and a series of one or more outer layers of hexagonally arranged carbon atom structures.

Despite the interest in carbon nanostructures and the potentially important uses for such structures, the practical application of carbon nanostructures in products has been slowed by the difficulty in manufacturing such structures. Two general types of processes have been employed to produce or isolate carbon nanostructures. One process type uses a plasma arc between carbon electrodes. U.S. Pat. Nos. 5,482,601 and 5,753,088 describe such carbon plasma arc processes for producing carbon nanotubes. Another process type involves simply isolating naturally formed, self-assembled carbon nanotubes from graphite and soot. Such an isolation process or refinement process for carbon nanotubes is described in U.S. Pat. No. 5,560,898. The prior processes for producing or isolating carbon nanotubes have been found to produce only small quantities of carbon nanotubes of inconsistent quality. The low quality carbon nanotubes produced or isolated by the prior methods commonly included metal or other atoms incorporated in the carbon structure. These impurities incorporated in the walls of the carbon nanotubes may have a negative impact on the qualities and properties of the nanotube and may render it unsuitable for an intended purpose.

SUMMARY OF THE INVENTION

The present invention provides a method for producing a collection surface on which high quality, substantially impurity-free carbon nanostructures may be formed or collected. The invention also encompasses apparatus for performing the collection surface preparation according to the invention and for the producing and collecting carbon nanostructures on the prepared nanostructure collection surface.

A method according to the present invention includes producing deposition conditions in a collection area above a reactant liquid containing one or more catalyst metals. The reactant liquid is maintained under conditions in which atoms of the catalyst metal may escape from the reactant liquid into the collection area. The method also includes directing a suitable carrier gas to traverse a surface of the reactant liquid and flow along a collection path that passes over a collection surface in the collection area. This flow of carrier gas is maintained so that escaped atoms of catalyst metal are entrained in the gas traversing the surface of the reactant liquid and are deposited on the collection surface.

As used in this disclosure and the accompanying claims, the "deposition conditions" in the collection area comprise those conditions in which there is no significant chemical or physical interference with the desired deposition of metal catalyst atoms on the collection surface. Chemical interference would be any chemical reaction with the liberated metal catalyst atoms that would prevent the metal catalyst atoms from the desired deposition. Physical interference would be any physical condition that would prevent the metal catalyst atoms from being deposited on the collection surface. For example, the presence of free non-catalyst atoms (extraneous atoms other than those making up the carrier gas) at the collection surface may cause the extraneous atoms to be incorporated with the metal catalyst atoms deposited on the collection surface and make the metal catalyst less effective or undesirable for promoting carbon nanostructure formation. Thus, producing "deposition conditions" according to the present invention may comprise producing an atmosphere in which extraneous atoms are separated or limited in some fashion from the collection surface.

Once the metal catalyst atoms are deposited, or perhaps even concurrently with metal catalyst deposition, carbon-bearing feed material may be introduced into the reactant liquid. The reactant liquid reacts with this carbon-bearing feed material to liberate carbon atoms in an excited state. These liberated carbon atoms in the excited state are directed to traverse the surface of the reactant liquid and escape into the collection area where the carbon atoms may form carbon nanostructures on the metal catalyst-prepared collection surface. As used in this disclosure and the accompanying claims, an "excited state" for carbon atoms is any electron state above the ground state. In an excited state according to the present invention, the electrons of the liberated carbon atoms may be either at the second energy level, third energy level, or fourth energy level, and including the non-spectroscopic valence energy level.

An apparatus according to the present invention includes a reactant liquid vessel for containing a metal catalyst-bearing reactant liquid at a reactant liquid level. An injection arrangement is included in the apparatus for injecting a stream of carrier gas and/or feed material into the reactant liquid vessel at a point below the reactant liquid level. A collection chamber is positioned to receive effluent escaping from the reactant liquid in the reactant liquid vessel in an effluent ejection area, and a collection surface forms a surface in the collection chamber at a position above the reactant liquid level and adjacent to the effluent ejection area. The apparatus may further include a collection surface charging device operatively connected to the collection surface to produce a desired electrical charge on the collection surface to encourage the deposition of metal catalyst atoms.

These and other advantages and features of the invention will be apparent from the following description of the preferred embodiments, considered along with the accompanying drawings.

DESCRIPTION OF PREFERRED EMBODIMENTS

The claims at the end of this application set out novel features which the Applicant believes are characteristic of the invention. The various advantages and features of the invention together with preferred modes of use of the invention will best be understood by reference to the following description of illustrative embodiments read in conjunction with the drawings introduced above.

Figure 1:
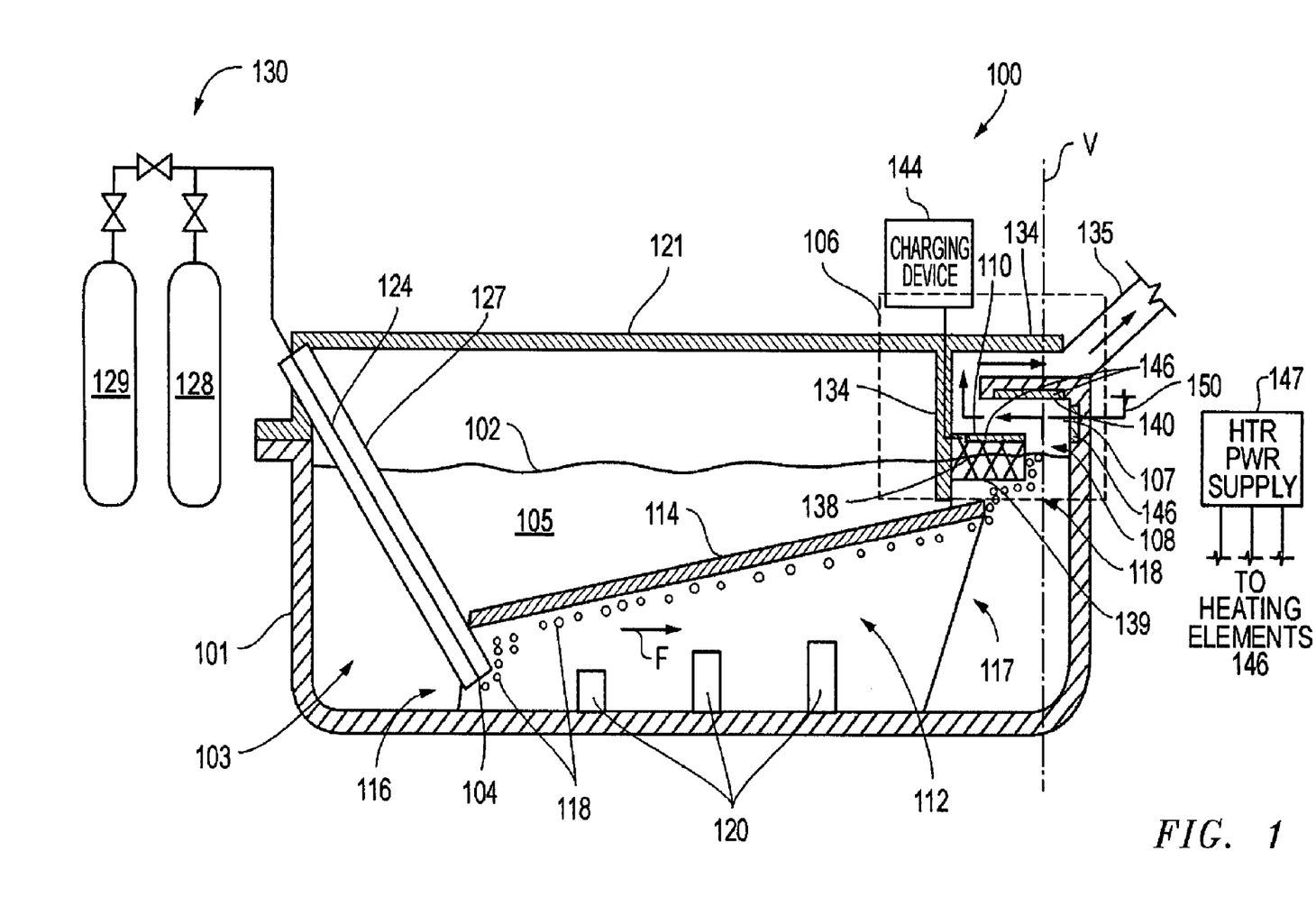
FIG. 1 is a diagrammatic representation of an apparatus embodying the principles of the invention.

Referring to the diagrammatic representation of FIG. 1, an apparatus 100 for preparing a collection surface and producing carbon nanostructures according to the present invention includes a reactant liquid vessel 101 for containing a reactant liquid 105 at a reactant liquid level 102. An injection arrangement shown generally at reference numeral 103 allows a stream of feed material to be injected into reactant liquid vessel 101 at an injection point 104 below reactant liquid level 102. Apparatus 100 further includes a collection arrangement shown generally in dashed box 106. The illustrated collection arrangement includes a collection chamber 107 positioned to receive effluent escaping from the reactant liquid in an effluent ejection area shown generally at reference numeral 108. The collection arrangement also includes a collection surface 110 within collection chamber 107, the collection surface residing at a position above the reactant liquid level and adjacent to effluent ejection area 108.

Figure 2:
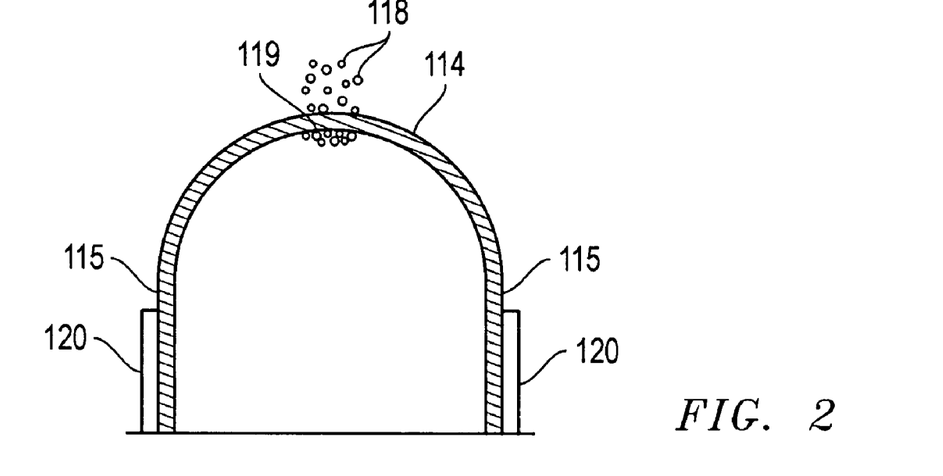
FIG. 2 is a diagrammatic end view of an outlet end of the reaction chamber shown in FIG. 1.

The apparatus shown in FIG. 1 includes a reaction chamber portion formed within vessel 101 below the reactant metal level 102. This reaction chamber is shown generally at reference numeral 112 and is defined by a tunnel structure having an upper wall 114 located below the reactant liquid level 102 in vessel 101. The tunnel structure is best shown in the end view of FIG. 2 and includes side walls 115 in addition to the upper wall 114. Referring again to FIG. 1, the tunnel structure produces an elongated tunnel below the reactant liquid level 102 in vessel 101. Feed material is injected at a feed end 116 of the tunnel structure and reaction products from the reaction of the reactant liquid with any non-inert feed material constituents exit the tunnel structure at an outlet end 117. The figures show these reaction products or non-reacted inert gasses in the reactant metal as bubbles 118. Preferred forms of the tunnel structure include one or more flow channels or lips 119 at the outlet end 117 that each define a location in which the relatively light reaction products collected at the top of the tunnel structure exit the tunnel. The importance of directing the reaction products to particular locations will be described further below in connection with the collection chamber 107.

The tunnel reaction chamber structure and reactant liquid vessel arrangement shown in FIG. 1 is similar to the arrangement shown in U.S. Pat. No. 6,227,126 to the present inventor. The entire content of this prior patent is incorporated herein by this reference. The function of the tunnel structure is to help ensure good contact between the reactant liquid and the feed material and between the reactant liquid and any intermediate reaction products that form from initial reactions of feed material. The placement of the tunnel below the reactant liquid level 102 also ensures that a pressure is maintained on the feed material and intermediate reaction products. This pressure results from the column of reactant liquid above the feed material and intermediate reaction products. The tunnel structure shown in the present drawings includes one or more vents or passages 120 along the length of the tunnel structure to allow fresh reactant metal to continually flow into the tunnel structure along its length and to help accommodate the expansion of gasses in the tunnel.

The form of the invention shown in FIG. 1 includes an enclosure 121 over reactant liquid vessel 101. It will be appreciated that apparatus 100 will also commonly require an arrangement for heating the reactant liquid to maintain it in a desired temperature range, and an arrangement for circulating the reactant liquid in vessel 101 and especially through the reaction chamber 112 defined by the tunnel structure walls 114 and 115 in the direction shown by arrow F in FIG. 1. Further details on the tunnel structure and the structure of vessel 101 and arrangements for heating and circulating reactant liquid, particularly a liquid reactant metal such as aluminum together with other metal catalysts, may be found in U.S. Pat. No. 6,227,126. However, since these details are not necessary for an understanding of the present invention, such details are omitted here.

Feed material injection arrangement 103 includes an injection conduit 124 having an outlet end that extends to injection point 104 below the reactant liquid level 102. The injection point 104 is located so that the feed material exiting the conduit is captured within the tunnel structure under upper wall 114 and thus is forced to flow along the upper wall and along the entire length of the tunnel structure before it can exit the reactant liquid in effluent ejection area 108. This flow along the lower surface of upper tunnel wall 114 helps ensure complete destruction of the non-inert feed materials and any intermediate reaction products that may form as the non-inert feed material is destroyed by reaction with or in the reactant liquid. Injection point 104 is also preferably at a depth below the reactant liquid level 102 to produce a desired reaction pressure due to the column of reactant liquid above the injection point. For a predominantly aluminum reactant liquid, this pressure is approximately 2.4 pounds per square inch above atmospheric pressure. Due to the relatively high temperature that may be present in the reactant liquid, conduit 124 is preferably enclosed in a suitable thermal insulating sheath 127 which may comprise one or more layers of insulating material or a jacket through which a cooling fluid may be circulated. The upper end of conduit 124 is connected to a line which ultimately extends to a carbon-bearing material supply 128 and preferably a purge gas supply 129 through a suitable arrangement of control valves 130. As will be discussed further below, an inert gas or mixture of gasses may be used as a feed material to produce the desired deposition of metal catalysts on collection surface 110. Such an inert gas or gas mixture may serve as the carrier gas which helps facilitate the desired metal catalyst deposition. The feed material may then be switched over to the carbon-bearing material to effect the desired formation of carbon nanostructures on the metal catalyst-prepared collection surface.

Collection chamber 107 is located with respect to the outlet end 117 of the tunnel structure so that reaction products and/or inert gasses 118 are ultimately captured in the collection chamber. That is, the reaction products and/or inert gasses 118 flow up from flow channels 119 and traverse the surface of the reactant liquid in effluent ejection area 108 into the area defined as collection chamber 107. This area is defined by chamber walls 134. An outlet conduit 135 receives material that is not collected within chamber 107 and preferably carries that material, which may include gasses, carbon, and materials (especially metal catalysts) that escape the reactant liquid bath. The outlet conduit 135 makes chamber 107 an open system from which gasses may freely exit or vent. Although it is not shown in FIG. 1, it will be appreciated that suitable equipment may be connected to outlet conduit 135 to remove recoverable material from the effluent that is vented from chamber 107 through the outlet conduit.

In the form of the invention shown in FIG. 1, collection surface 110 comprises an upper surface of a collection structure 138 that either floats or is fixed so that a lower surface 139 of the structure resides below reactant liquid level 102 while the collection surface 110 resides above the reactant liquid level in collection chamber 107. Although other materials may be used to form the collection surface 110, the surface is preferably formed from carbon, silicon, silicon dioxide, or various metals. It will be appreciated, however, that only the surface 110 may be formed from one of these preferred materials and the remainder of collection structure 138 may be formed from some other material. A deflection surface 140 may also be included in collection chamber 107 positioned to deflect effluent traversing the surface of the reactant liquid in effluent ejection area 108 so that the effluent, including the carbon atoms in the excited state, flow over collection surface 110. It will be noted that in the embodiment shown in FIG. 1, both collection surface 110 and deflection surface 140 extend in a respective plane transverse to a device vertical axis V. Also, in the embodiment shown in FIG. 1, lower surface 139 of collection structure 138 forms a blocking structure positioned above the respective flow channel 119 and below the reactant liquid level 102 in reactant liquid vessel 101. The effluent from the feed material/reactant liquid reaction must flow around this blocking structure in order to reach effluent ejection area 108 and exit the reactant liquid.

Collection surface 110 may be essentially planar or may have some non-planar profile. Also, it should be noted that various structures may be formed on collection surface 110, upon which metal catalysts atoms may be deposited according to the invention. The structures or profiles that may be used on collection surface 110 may be any structures or profiles that facilitate or encourage the catalyst metal deposition of the present invention.

Some preferred forms of the present invention include placing an electrical charge on collection surface 110. That is, the invention may include imparting an electrical characteristic to collection surface 110 that is different from the natural electrical characteristic of the material making up the collection surface. To facilitate such an electrical charge, apparatus 100 shown in FIG. 1 includes a collection surface charging device 144 operatively connected to collection surface 110 through one or more electrical leads. The charge may be positive or negative, continuous, intermittent, alternating, or combinations of any of these, depending upon the nature of the collection surface 110, the structure 138 on which the collection surface is formed, the metal catalyst being used, and the electrical properties of the forming nanostructures. Generally, any charge that encourages the desired deposition of metal catalyst atoms may be used within the scope of the invention, and charging device 144 may comprise any device suitable for imparting the desired electrical charge. It will be noted that since the reactant liquid in vessel 101 may be electrically conductive, apparatus 100 may include an arrangement for electrically isolating collection surface 110 from the reactant liquid in vessel 101. The desired electrical isolation may be accomplished by including conductive material only at collection surface 110 and forming the remainder of collection structure 138 from a dielectric material such as silicon dioxide.

Some preferred forms of the present invention may also include manipulating the temperature of collection surface 110 and the temperature in collection chamber 107. Temperature manipulation may be accomplished by employing one or more heating elements in one or more of the chamber walls 134 and/or in the collection structure 138 and/or in the structure making up deflection surface 140. These heating elements are indicated in FIG. 1 at reference numeral 146. Preferred heating elements may include electrical resistance heating elements such as nichrome heater coils protected by a suitable material from direct contact with the atmosphere in collection chamber 107. For example, quartz protected nichrome heating coils may be used as heating elements within the scope of the present invention. Where electrical resistance heating elements are used for elements 146, the apparatus will include one or more power supplies 147, connected to the heating elements by suitable electrical leads (not shown in the figures). It will be appreciated that there are numerous variations possible in applying heat to the atmosphere in collection chamber 107. The heating elements could be housed in the respective wall or positioned on an interior surface. Also, electrical coils for use in applying electrical induction heating to the atmosphere in collection chamber 107 may be located outside the collection chamber but in position to apply the desired electrical fields to one or more induction targets in or adjacent to the collection chamber. Such induction coils would require an induction heating power source to drive the coils to produce the desired induction heating fields.

Figure 3:
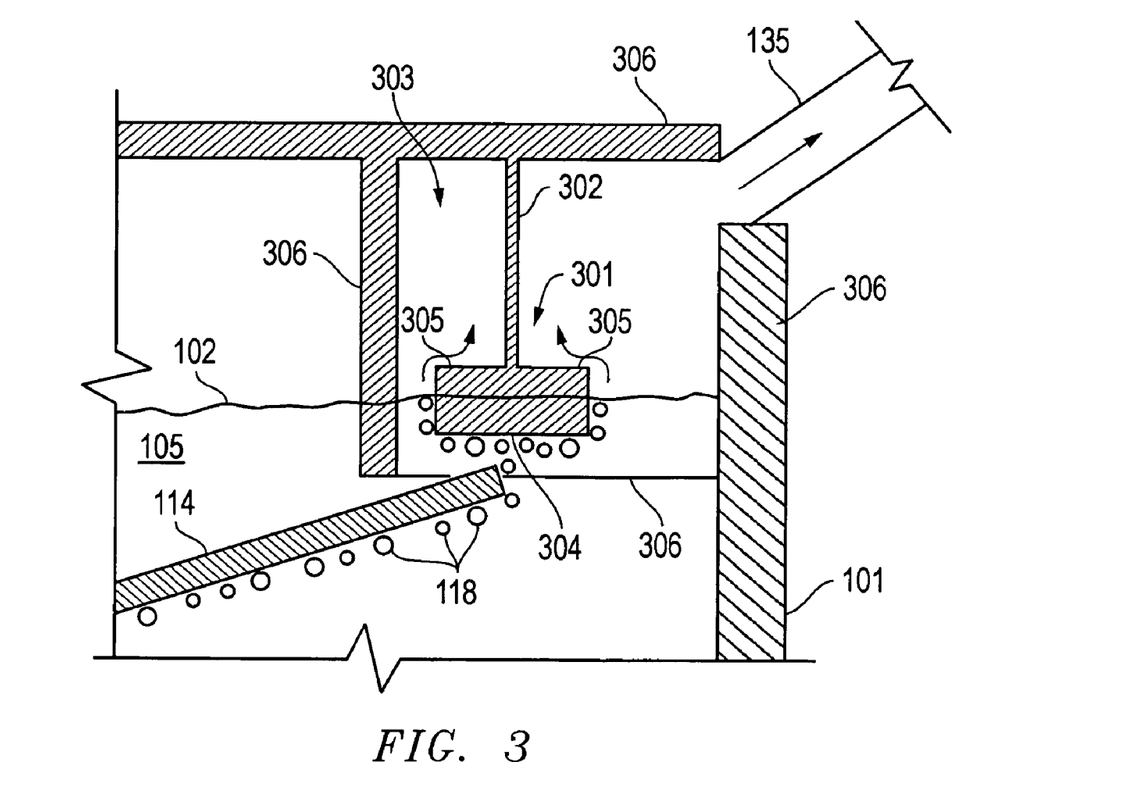
FIG. 3 is a diagrammatic representation of an alternate collection chamber according to the present invention.

Referring to FIG. 3, an alternate collection surface arrangement includes a collection structure 301 mounted on a rod 302 or other suitable support in collection chamber 303 defined by chamber walls 306. Lower surface 304 of structure 301 provides a blocking surface similar to surface 139 shown in FIG. 1. Surface 305 provides the collection surface in the embodiment shown in FIG. 3. This alternate embodiment is advantageous because the entire collection structure 301 may be readily withdrawn from collection chamber 303 through a suitable access opening (not shown) in the chamber in order to gain access to the collection surface 305 and remove carbon nanostructures that have collected on the collection surface. It is noted that vessel 101, outlet conduit 135, tunnel upper wall 114, reactant liquid 105 and reactant liquid level 102 are identical to those shown in FIG. 1.

Figure 4:
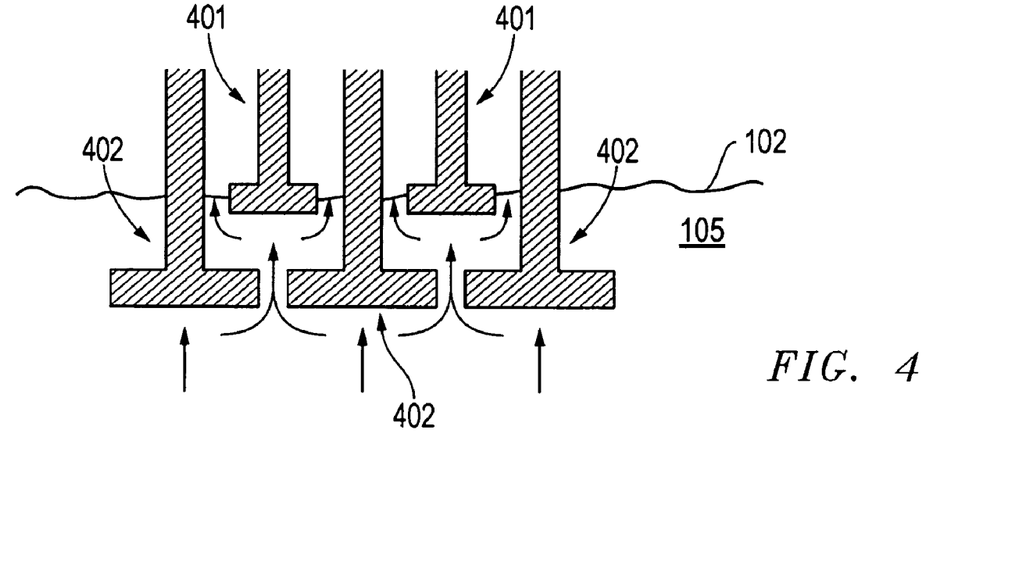
FIG. 4 is a diagrammatic representation of another alternate collection surface arrangement within the scope of the present invention.

The alternate embodiment shown in FIG. 4 includes collection structures 401 similar to structure 301 shown in FIG. 3. However, the embodiment shown in FIG. 4 also includes additional blocking structures 402 supported below the reactant liquid level 102. These blocking structures 402 direct reaction products and inert gasses in the reactant liquid 105 toward a central portion of each collection structure 401 so that the reaction products must flow around the collection structures to exit the reactant liquid. It will be noted that the view in FIG. 4 is at about 90 degrees to the view in FIGS. 1 and 3. It will be further noted that multiple spaced apart flow channels at the outlet end 117 of a tunnel structure such as that shown in FIG. 1 would be required to allow the reaction products to flow up properly beneath each of the blocking structures 402 shown in FIG. 4.

Figure 5:
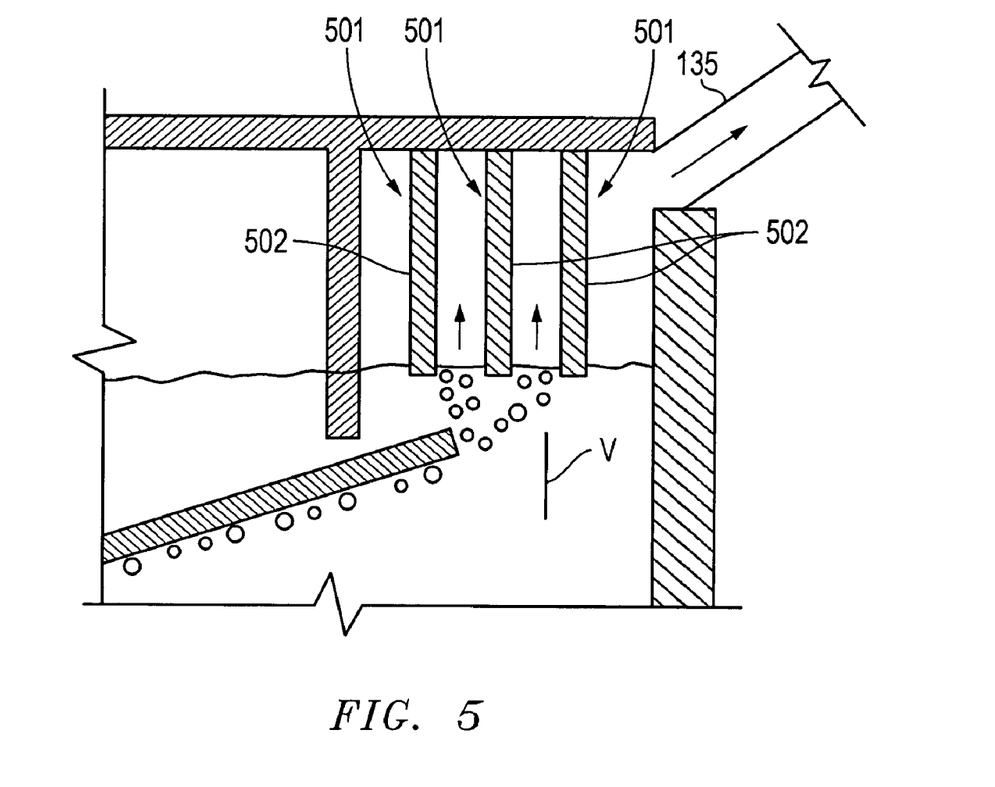
FIG. 5 is a diagrammatic representation of another alternate collection chamber according to the present invention.

The alternate collection arrangement shown in FIG. 5 includes a series of collection members 501 having vertically extending collection surfaces 502. The vertical orientation of surfaces 502 is in contrast to the collection surface 110 shown in FIG. 1, which extends transverse to the device vertical axis V. That is, the collection surfaces 502 extend parallel to device vertical axis V rather than transverse. Collection members 501 may comprise cylinders or plates that are spaced apart sufficiently to allow materials rising from the reactant liquid to reach outlet conduit 135.

A method according to the present invention may now be described with reference particularly to the embodiment shown in FIG. 1. Such a method includes first liberating metal catalyst atoms from reactant liquid 105 and then causing a suitable carrier gas to traverse the surface of the liquid reactant metal in the effluent ejection area 108 so that the gas flows over collection surface 110. This gas traversing the liquid reactant metal surface picks up or entrains the liberated metal catalyst atoms and carries the metal catalyst atoms over collection surface 110 where they may be deposited on the surface. Each such deposited metal catalyst atom may form a catalyst for the collection of carbon atoms in a carbon nanostructure production process with apparatus 100. That is, once the desired metal catalyst atoms are deposited on substrate collection surface 110, carbon atoms liberated from the reactant liquid in an excited state are then directed over the metal catalyst-prepared collection surface 110 to form carbon nanostructures. The desired excited carbon atoms are preferably liberated from the reactant liquid by injecting a hydrocarbon or other suitable carbon-bearing feed material from supply 128 into the reactant liquid 105 in vessel 101. The desired nanostructure formation is facilitated by maintaining a collection atmosphere in the area immediately above collection surface 110 in which atmosphere extraneous atoms are limited or reduced and carbon atoms are encouraged by temperature conditions to remain in the excited state until they can phase change to a ground state as they combine with other carbon atoms to produce carbon nanostructures. Where the reactant liquid is made up predominantly of aluminum together with one or more alloyed metal catalysts, the reactant liquid is preferably maintained between approximately 650 degrees Celsius and approximately 1950 degrees Celsius to facilitate both the liberation of metal catalyst atoms and excited carbon atoms.

Maintaining deposition conditions in chamber 107 and at surface 110 to facilitate metal catalyst deposition prior to carbon nanostructure formation may include controlling the temperature and effluent flow conditions, as well as the appropriate atmosphere in chamber 107. In particular, an appropriate metal catalyst deposition atmosphere comprises an atmosphere that does not chemically or physically interfere with the desired carbon nanostructure formation to any significant degree. Purging collection chamber 107 of materials that could chemically react with the liberated metal catalyst atoms before they are deposited on surface 110 can be particularly important in forming the desired deposition atmosphere. Thus, a preferred process includes first purging the chamber 107 by directing a suitable purge gas such as argon or some other noble gas or an inert gas or mixture of such gasses from purge supply 129 to chamber 107, and then injecting further inert gas to entrain liberated metal catalyst atoms and carry those atoms to collection surface 110. A separate purge arrangement may alternatively or additionally be included in the system with a purge inlet directly in chamber 107. This alternate purge arrangement for chamber 107 allows the chamber to be purged without injecting any gas into reactant liquid 105, and allows injecting the appropriate inert gas into the reactant liquid only to entrain liberated metal catalyst atoms and carry the entrained catalyst atoms to collection surface 110.

The flow regime of effluent exiting the reactant liquid and flowing through collection chamber 107 may be important for allowing liberated metal catalyst atoms to be deposited as desired and later for allowing the chemically excited carbon atoms to bond together to produce the desired carbon nanostructures without extraneous atoms becoming incorporated in the structures. It is believed that a turbulent flow regime over collection surface 110 best facilitates the deposition of catalyst metal atoms on collection surface 110, while a non-turbulent flow regime best facilitates the production of carbon nanostructures on the prepared surface 110 without incorporating heavier atoms (such as metals) that may escape from the reactant liquid bath. It may also be possible to adjust the flow rate and composition of effluent flowing over collection surface 110 to encourage the desired deposition of catalyst metal atoms and the incorporation of various atoms other than carbon in the carbon nanostructures produced at the collection surface. The invention encompasses numerous techniques for controlling the composition and flow rate of effluent through collection chamber 107 and over collection surface 110.

Some forms of the invention may purposefully inject one or more materials into the collection chamber 107 through a separate collection chamber input, that is, separate from effluent ejection area 108, in order to affect the chemical and flow characteristics in the flow chamber and in order to provide desired materials to be incorporated in the carbon nanostructures. Such a separate collection chamber input may include a suitable tube 150 which traverses a collection chamber wall and which includes an injection end to inject other desired materials against or over collection surface 110 as effluent flows up from the reactant liquid 105 and passes over the collection surface.

One preferred form of the invention employs a separate input such as input 150 into collection chamber 107 to inject water or water vapor into the collection area, or onto the surface of reactant liquid 105 to form a desired concentration of water vapor in the collection chamber. This water vapor in collection chamber 107 may help prevent or reduce the formation of amorphous carbon in the collection chamber and particularly on collection surface 110. Alternative systems may produce the desired water vapor concentration in collection chamber 107 by including a suitable fraction of water in the carrier gas and/or feed material injected into reactant liquid 105 through injection conduit 124.

Regardless of whether the carrier gas for the catalyst metal atoms and carbon atoms is injected through the reactant liquid or injected directly into collection chamber 107 through a suitable inlet, the carrier gas may include noble gasses such as argon, inert gasses such as nitrogen, and even carbon-bearing gasses such as oxides of carbon. It should also be noted that it may be desirable to cause a mixture of metal catalyst atoms and excited carbon atoms to flow over a collection surface in the invention such as surface 110 in FIG. 1. In this case, the flow regime over the collection surface may be maintained to allow catalyst metal atom deposition concurrently with nanocarbon structure formation. Simultaneous catalyst metal atom deposition and nanostructure formation may be accomplished by injecting a suitable carbon-bearing feed material into the reactant liquid (such as at point 104 in FIG. 1), while maintaining appropriate deposition conditions adjacent to the collection surface (110 in FIG. 1) by electrically charging the collection surface and/or by maintaining suitable flow conditions over the collection surface.

The invention also encompasses numerous variations to produce the desired flow regime and flow characteristics through collection chamber 107. In addition to controlling the material injection rates into the reactant liquid 105 and into collection chamber 107, two other methods are employed in apparatus 100 shown in FIG. 1 to control the flow of materials through the collection chamber. One method employs deflection surface 140 to deflect effluent escaping from the reactant liquid at effluent ejection area 108. This deflection is preferably produced no more than three feet above the surface of the reactant liquid. Other types of deflection surfaces or features may also be employed according to the present invention. The other flow regime and characteristic affecting technique used in the apparatus shown in FIG. 1 comprises providing collection surface 110 in a transverse plane with respect to device vertical axis V along which the effluent initially flows as it escapes the reactant liquid. Providing this transverse collection surface 110 produces a low pressure area on the collection surface in an area near the rightmost edge in FIG. 1. The low pressure area created as effluent flows over the rightmost upper edge of collection structure 138 in FIG. 1 is believed to encourage the both the deposition of metal catalyst atoms at that location of collection surface 110 and the collection of chemically excited carbon atoms to produce carbon nanostructures at that location. It will be appreciated that numerous different collection surface profiles or contours may be employed to encourage the desired deposition of metal catalyst atoms and then the collection of carbon atoms and self-assembly of nanostructures. For example, collection surface 110 may include one or more projections and/or indentations to help produce the desired flow characteristics across the collection surface.

It will be noted from FIGS. 1, 3, and 5 that the present invention includes producing nanostructures in a flow-through (open) system as opposed to closed system. That is, and referring to the example of FIG. 1, atoms eluding from the reactant liquid 105 into collection chamber 107 may flow continuously through the collection chamber and exit the system through outlet 135. It is believed that this flow-through arrangement has the benefit of allowing extraneous atoms that are liberated particularly from feed materials, and particularly hydrogen atoms that are liberated from hydrocarbon feed materials, to exit the system without being bound up with the nanostructures being collected or produced at collection surface 110. It is believed that the flow rate at which the materials eluding from reactant liquid 105 pass through the collection chamber 107 allow the light hydrogen atoms to pass by collection surface 110 while the excited carbon atoms swirl over the collection surface 110 (with or without the metal catalyst deposited thereon). This swirling action of the excited carbon atoms, it is believed, helps encourage the desired formation of carbon nanostructures at the collection surface. Also, the separation of extraneous atoms such as hydrogen from the stream of material eluding from reactant liquid 105 leaves a carbon-rich stream of material (that is, rich in excited state carbon atoms) which flows over collection surface 110 to help facilitate carbon nanostructure formation.

Some preferred forms of the present invention further include producing a desired electrical charge on collection surface 110 at least for the deposition of metal catalyst atoms, and perhaps to encourage carbon nanostructure assembly after the desired metal catalysts are deposited. The electrical charge is preferably imparted by electrical charge device 144 through suitable electrical leads to collection surface 110.

Many different types of reactant liquids may be used to provide the desired liberated metal catalyst atoms and also react the feed materials or feed material constituents according to the present invention to liberate excited carbon atoms. A preferred reactant liquid comprises liquid aluminum either alone or with other metals, as well as a controlled water vapor collection chamber aqueous vapor spraying system, as disclosed in U.S. Pat. No. 5,000,101, which is also incorporated herein in its entirety. Temperatures may preferably range from approximately 650 degrees Celsius to approximately 1950 degrees Celsius for reactant metals incorporating a substantial fraction of aluminum and approximately 400 degrees Celsius to approximately 1200 degrees Celsius above the liquid metal bath. Other reactant liquids may be used within different temperature ranges sufficient to liberate carbon atoms in the chemically excited state for assembly into nanostructures at collection surface 110 and to release metal catalyst atoms. The invention encompasses any liquid that either reacts with the feed material or otherwise causes carbon atoms in the desired excited state to be liberated from the feed material and which liberates the desired metal catalyst atoms for deposition on surface 110. The chemically excited carbon atoms may be liberated by chemical reduction (as in the case of a reactant liquid made up predominantly of aluminum or an aluminum alloy), by chemical oxidation, by providing chemically neutral electron reduction potentials, or by applying sufficient kinetic energy (through heat) to break the carbon bonds to other atoms in the feed molecules, or by any combinations of these mechanisms. The reactant liquid may be a metal, acid, base, salt, or any combination of these. The temperature of the particular liquid will depend upon the particular reaction required to liberate the catalyst metal atoms and the excited carbon atoms and the nature of the reactant liquid itself. For example, chemically neutral liquids that liberate carbon atoms and catalyst metal atoms by heat alone may be held at very high temperatures to produce the desired carbon liberation, on the order of approximately 1500 degrees Celsius or more. It will be appreciated that the mechanism used to liberate catalyst metals according to the invention may be a different mechanism than that employed to liberate chemically excited carbon atoms. For example, a reactant liquid metal, acid, base, or salt may liberate chemically excited carbon atoms by heat alone or by heat together with some chemical reaction, while the same reactant liquid may liberate catalyst metal atoms by heat alone.

Especially for carbon nanostructure formation after metal catalyst deposition, collection surface 110 is also preferably maintained in a similar temperature range as the reactant liquid, as is the atmosphere above the collection surface, and most preferably at a temperature just below the reactant liquid temperature, for example, approximately fifty (50) degrees Celsius or less below the liquid reactant temperature. It is believed that the reactant liquids and the temperature in the collection chamber (107 in FIG. 1) in which the metal catalysts atoms and the excited carbon atoms are eluded, together with the reaction pressure and contact time with the reactant liquid not only completely liberate the carbon atoms from the hydrocarbon feed material but also place the carbon atoms in the desired excited state, and maintain the excited state sufficiently to allow the carbon atoms to collect together in the desired nanocarbon structures at the collection surface (110 in FIG. 1). The reactant liquid is also believed to surround the liberated carbon atoms while they are still in the reactant liquid to maintain the carbon atoms in the chemically excited state and prevent them from phase changing to a ground state before they have a chance to self-assemble into the desired nanostructures at the collection surface. The conditions are maintained at the collection surface, above the liquid metal bath, according to the present invention so that these carbon atoms phase change to a ground state as they bond covalently with other carbon atoms at the metal catalyst-prepared collection surface to form the desired carbon nanostructures.

It will be appreciated that some carbon that escapes the reactant liquid may also be diatomic carbon and double or triple bonded carbon. As used in this disclosure and the accompanying claims, "liberated carbon atoms" includes single atom carbon, diatomic carbon, and other two-carbon combinations such as two-carbon double bonded structures and two-carbon triple bonded structures. All of the liberated carbon atoms escaping the reactant liquid will be chemically excited. Some of the two-carbon combinations that may escape the reactant liquid may be incorporated, together with single, chemically excited carbon atoms, into molecularly combined carbon nanostructures within the scope of the present invention. The present invention of producing carbon nanostructures on the metal catalyst-prepared collection surface (110 in FIG. 1) may use any number of hydrocarbon compounds as the feed material or as part of the feed material. Preferred forms of the invention utilize hydrocarbon compounds including single-bonded, double bonded, and triple bonded carbon atoms either predominantly or exclusively. However, other carbon compounds including mixtures of double and triple bonded carbon may be used according to the invention provided the respective carbon compound is given sufficient contact time with the reactant liquid to liberate carbon atoms and place them in a chemically excited state for assembly into carbon nanostructures. Some forms of the invention may adjust the content of the various hydrocarbon materials in a feed material mixture to provide a desired concentration of liberated single carbon atoms and liberated carbon molecules for incorporation into the desired carbon nanostructures. For example, the feed materials may be manipulated so that the effluent escaping the reactant liquid includes carbon in desired relative concentrations of single carbon atoms and double bonded carbon molecules. Examples of hydrocarbon feed materials that may be employed in carbon nanostructure formation according to the invention include methane, acetylene, crude oil or various crude oil constituents, or combinations of these materials.

A wide variety of metal catalysts may be used according to the invention. For example, metal catalysts may be selected from the Group VIB transition metals including chromium, molybdenum, and tungsten, Group VIIIB transition metals including iron, cobalt, nickel, ruthenium, rhodium, palladium, osmium, iridium, and platinum, all of the lanthanide series metals, and the actinide series metals, and combinations of any of these metals. Preferably the catalyst metal comprises a metal with one, two, three, four, or five electrons, including d levels in the outer valence shells.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. An apparatus including:
   (a) a reactant liquid vessel for containing a reactant liquid at a reactant liquid level;
   (b) an injection arrangement for injecting a stream of feed material into the reactant liquid vessel at a point below the reactant liquid level;
   (c) a collection chamber positioned to receive effluent escaping from the reactant liquid in the reactant liquid vessel in an effluent ejection area, the collection chamber having a vertical extent defined between a top wall and the surface of the reactant liquid in the effluent ejection area, and having a lateral extent defined between lateral walls extending transverse to the surface of the reactant liquid in the effluent ejection area, the top wall extending transverse to the lateral walls;
   (d) a collection surface forming a surface in the collection chamber, the collection surface residing at a position above the reactant liquid level and adjacent to the effluent ejection area; and
   (e) a collection surface charging device operatively connected to the collection surface to produce a desired electrical charge on the collection surface.

2. The apparatus of claim 1 wherein the collection surface includes a portion extending in a plane transverse to a device vertical axis.

3. The apparatus of claim 1 further including a reaction chamber portion of the reactant liquid vessel, the reaction chamber portion including an upper wall located below the reactant liquid level in the reactant liquid vessel.

4. The apparatus of claim 1 wherein the collection surface includes graphite.

5. The apparatus of claim 1 further including a water injector conduit extending into the collection chamber.

6. The apparatus of claim 1 further including at least one heating element positioned to apply heat to the volume defined by the collection chamber.

7. A method including:
   (a) producing a collection atmosphere in a collection area above a reactant liquid, the collection area having a vertical extent defined between a top wall and the surface of the reactant liquid, and having a lateral extent defined between lateral walls extending transverse to the surface of the reactant liquid, the top wall extending transverse to the lateral walls;
   (b) injecting a feed material into the reactant liquid, the feed material including a quantity of a carbon-bearing compound;
   (c) maintaining the molecules of the carbon-bearing compound and any reaction products in contact with the reactant liquid for a period of time sufficient to liberate carbon atoms from the molecules of the carbon-bearing compound or reaction products and place the liberated carbon atoms in an excited state;
   (d) enabling the liberated carbon atoms in the excited state to traverse a surface of the reactant liquid and flow along a collection path through the collection area so that the liberated carbon atoms pass over a collection surface in the collection area, the collection surface comprising a surface distinct from the lateral walls and the top wall; and
   (e) heating the collection area from a heating element located above the surface of the reactant liquid.

8. The method of claim 7 wherein the heat is applied to the collection area from at least one of the lateral walls or from the top wall.

9. The method of claim 7 further including adding water vapor to the collection area while the liberated carbon atoms pass over the collection surface.

10. An apparatus including:
(a) a reactant liquid vessel for containing a reactant liquid at a reactant liquid level;
(b) an injection arrangement for injecting a stream of feed material into the reactant liquid vessel at a point below the reactant liquid level;
(c) a collection chamber positioned to receive effluent escaping from the reactant liquid in the reactant liquid vessel in an effluent ejection area, the collection chamber having a vertical extent defined between a top wall and the surface of the reactant liquid in the effluent ejection area, and having a lateral extent defined between lateral walls extending transverse to the surface of the reactant liquid in the effluent ejection area, the top wall extending transverse to the lateral walls;
(d) a collection surface forming a surface in the collection chamber, the collection surface residing at a position above the reactant liquid level and adjacent to the effluent ejection area, and being distinct from the lateral walls and top wall; and
(e) at least one heating element located above the reactant liquid level in position to apply heat to maintain a desired temperature in the volume defined by the collection chamber between the reactant liquid and the collection surface.

11. The apparatus of claim 10 wherein at least one heating element is positioned in at least one of the lateral walls.

12. The apparatus of claim 10 wherein at least one heating element is positioned in the top wall.

13. The apparatus of claim 10 wherein at least one heating element is positioned in a structure forming the collection surface.

14. The apparatus of claim 10 further including a collection surface charging device operatively connected to the collection surface to produce a desired electrical charge on the collection surface.

15. A method including:
(a) producing a collection atmosphere in a collection area above a reactant liquid, the collection area having a vertical extent defined between a top wall and the surface of the reactant liquid, and having a lateral extent defined between lateral walls extending transverse to the surface of the reactant liquid, the top wall extending transverse to the lateral walls;
(b) injecting a feed material into the reactant liquid, the feed material including a quantity of a carbon-bearing compound;
(c) maintaining the molecules of the carbon-bearing compound and any reaction products in contact with the reactant liquid for a period of time sufficient to liberate carbon atoms from the molecules of the carbon-bearing compound or reaction products and place the liberated carbon atoms in an excited state;
(d) enabling the liberated carbon atoms in the excited state to traverse a surface of the reactant liquid and flow along a collection path through the collection area so that the liberated carbon atoms pass over a collection surface in the collection area, the collection surface comprising a surface distinct from the lateral walls and the top wall; and
(e) applying an electrical charge to the collection surface in the collection area as liberated carbon atoms in the excited state flow along the collection path.

16. The method of claim 15 further including heating the collection area from a heating element located above the surface of the reactant liquid.

17. The method of claim 16 wherein at least one heating element is positioned in at least one of the lateral walls.

18. The method of claim 16 wherein at least one heating element is positioned in the top wall.

19. The method of claim 16 wherein at least one heating element is positioned in a structure forming the collection surface.

* * * * *